United States Patent [19]
Goldsworthy et al.

[11] 3,738,637
[45] June 12, 1973

[54] METHOD AND APPARATUS FOR FILAMENT WINDING ABOUT THREE AXES OF A MANDREL AND PRODUCTS PRODUCED THEREBY

[75] Inventors: William B. Goldsworthy, Palos Verdes Estates; John A. Bunnell, South Laguna, both of Calif.

[73] Assignee: Goldsworthy Engineering, Inc., Torrance, Calif.

[22] Filed: Apr. 23, 1970

[21] Appl. No.: 43,311

Related U.S. Application Data

[60] Division of Ser. No. 709,676, March 1, 1968, Pat. No. 3,701,489, which is a continuation-in-part of Ser. No. 591,387, Oct. 18, 1968, abandoned, which is a continuation of Ser. No. 156,563, Nov. 29, 1961.

[52] U.S. Cl. .................................. 269/61, 269/71
[51] Int. Cl. ............................................. B23q 3/18
[58] Field of Search ............... 269/24, 32, 57, 61, 269/71, 321 WE; 29/203 MW, 203 P

[56] References Cited
UNITED STATES PATENTS

| | | | |
|---|---|---|---|
| 2,966,721 | 1/1961 | Bordignon | 269/24 X |
| 2,976,827 | 3/1961 | Bauder | 269/24 X |

Primary Examiner—Granville Y. Custer, Jr.
Attorney—John D. Upham, Robert J. Schaap and Joseph D. Kennedy

[57] ABSTRACT

A mandrel supporting apparatus for use in filament winding systems and the like, which apparatus comprises a shiftable carriage mechanism having a plurality of mandrel-supporting shafts mounted thereon. Each of the shafts have their central axis disposed in perpendicular relationship with respect to each other and at their outer ends, each carry a mandrel-supporting table. Extendable arms provided with mandrel engaging clamping members are mounted on the underside of the table and a rack and pinion gear mechanism operable by a fluid power mechanism permits extension of these arms and actuation of the clamping members. The carriage and hence the mandrel-supporting tables are movable in a relatively vertically located arc so that the tables can be shifted from a supporting position where they are in a location to support a work element such as a mandrel to a remote position where they are not in engagement with the mandrel. Furthermore, during the shifting movement of the respective mandrel-supporting tables with the carriage, a mandrel can be shifted from one of the tables to the other so that work in the form of filament winding may be performed with respect to the mandrel.

8 Claims, 34 Drawing Figures

INVENTORS
WILLIAM B. GOLDSWORTHY
JOHN A. BUNNELL
BY
Robert J. Schaap
ATTORNEY

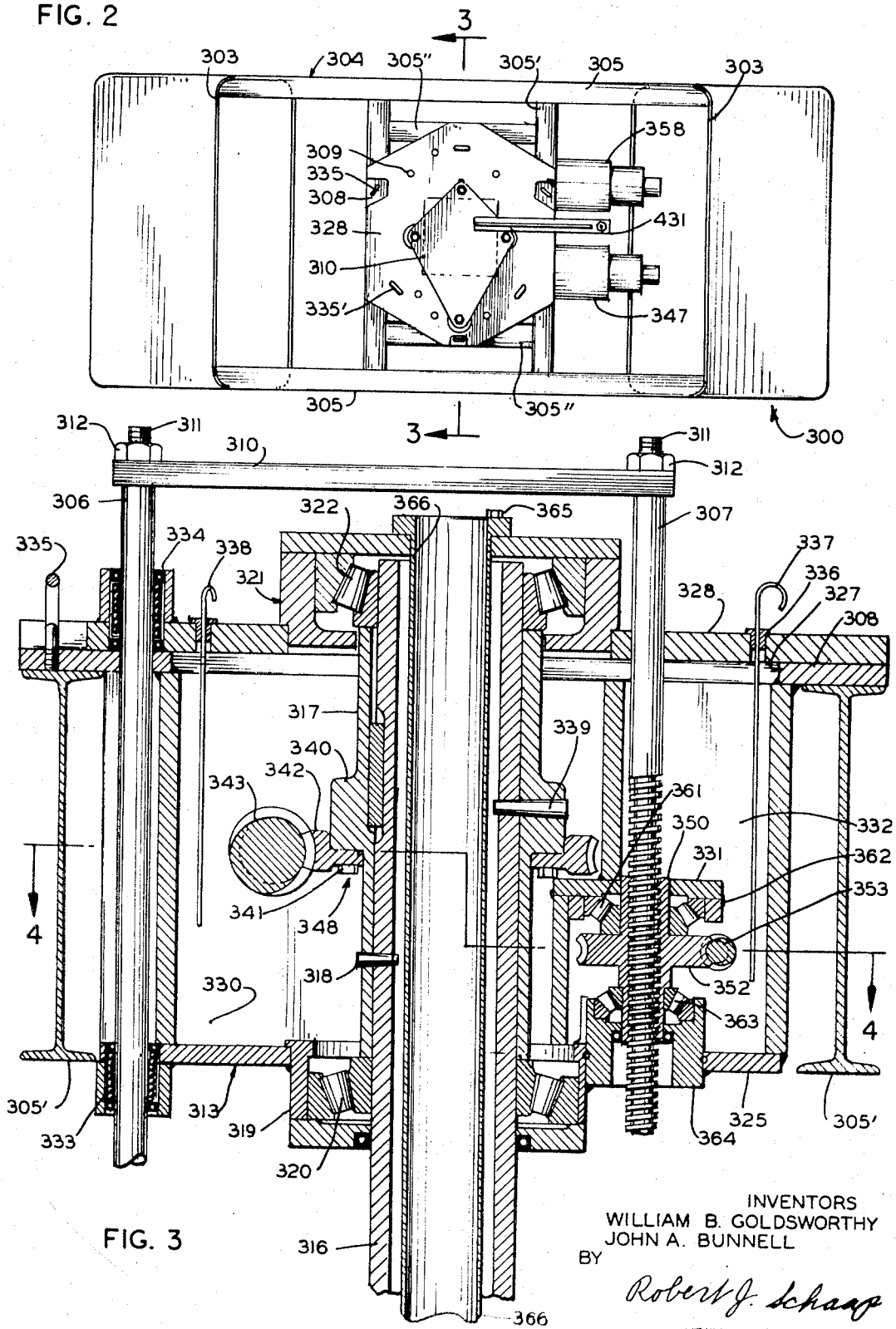

INVENTORS
WILLIAM B. GOLDSWORTHY
JOHN A. BUNNELL
BY
Robert J. Schaap
ATTORNEY

INVENTORS
WILLIAM B. GOLDSWORTHY
JOHN A. BUNNELL
BY
*Robert J. Schaap*
ATTORNEY

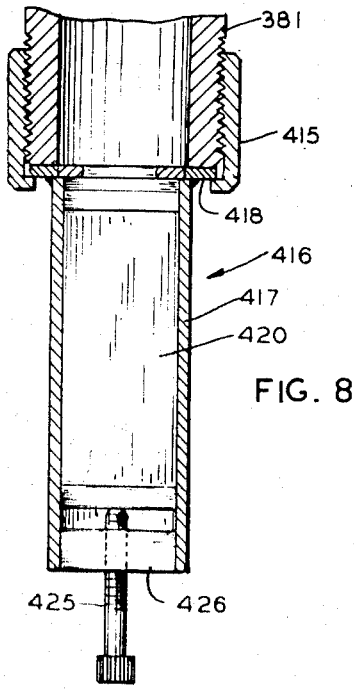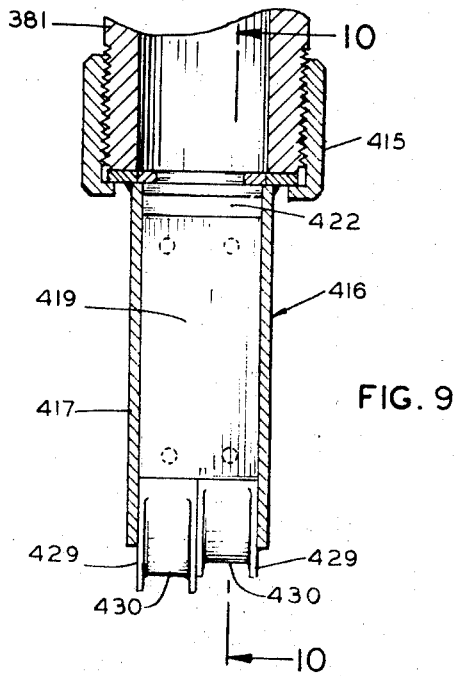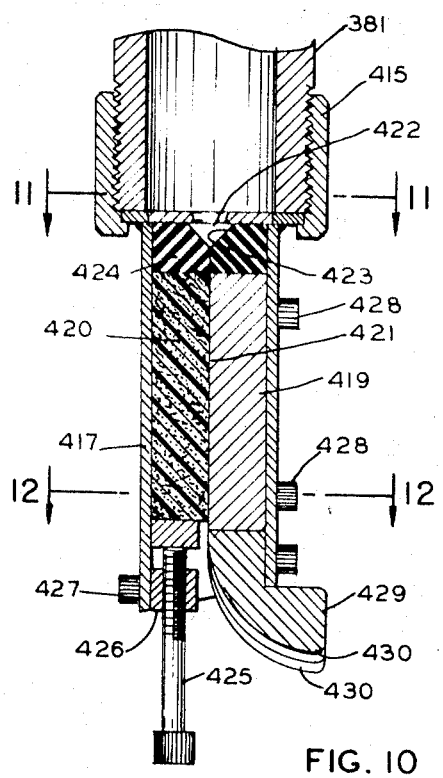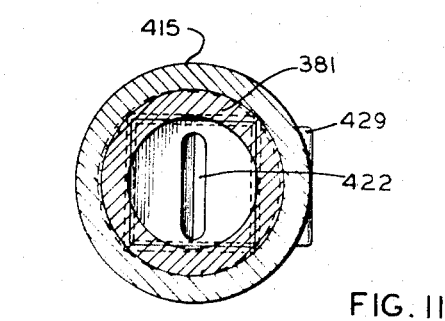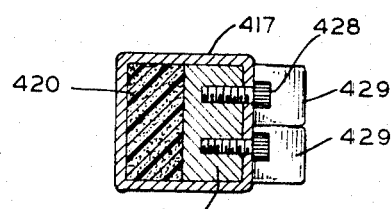

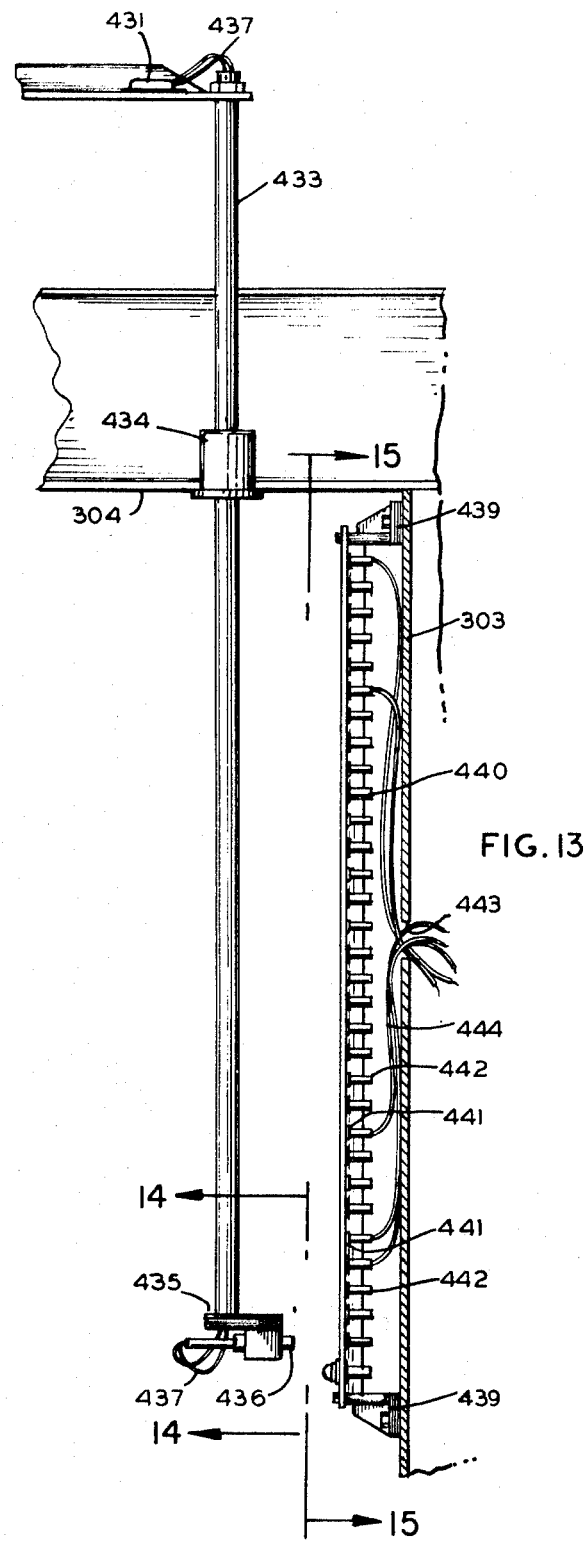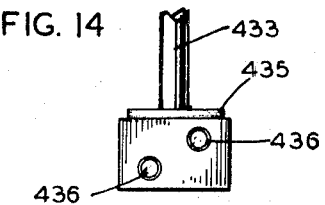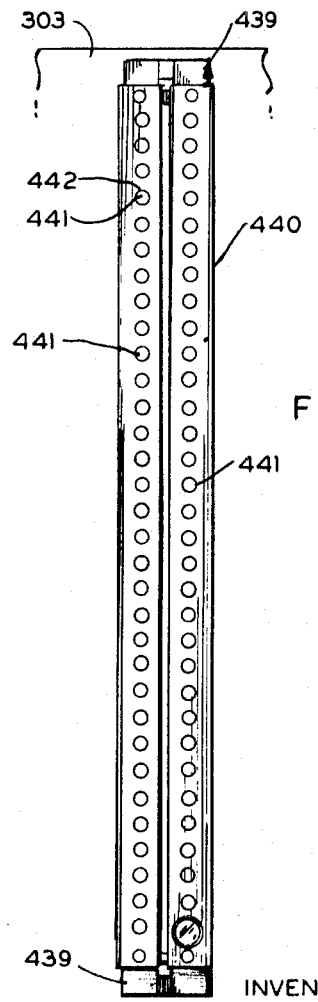

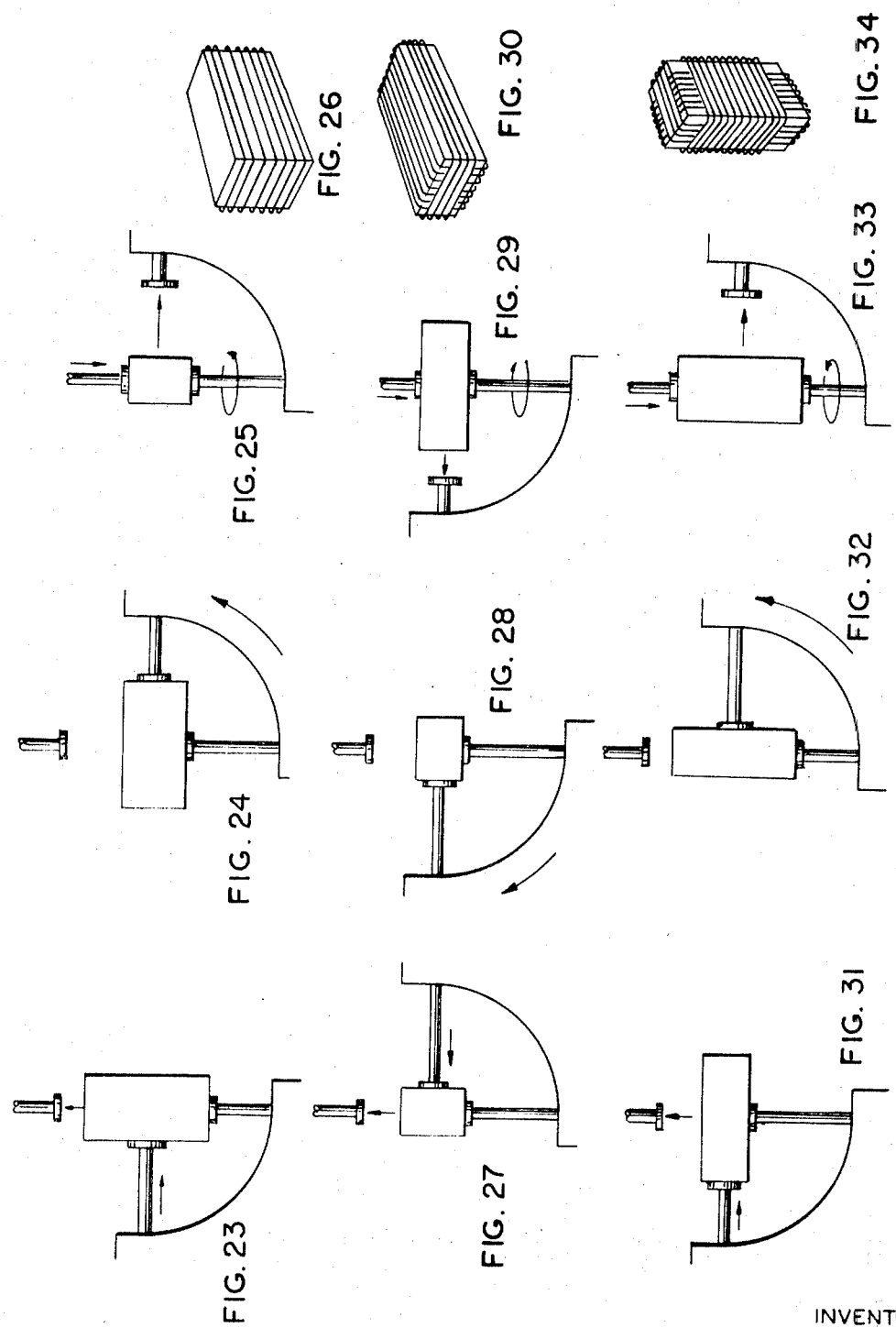

METHOD AND APPARATUS FOR FILAMENT WINDING ABOUT THREE AXES OF A MANDREL AND PRODUCTS PRODUCED THEREBY

This application is a division of my copending application, Ser. No. 709,676, filed March 1, 1968, now U.S. Pat. No. 3,701,489, dated Oct. 31, 1972, which is a continuation-in-part of my co-pending application Ser. No. 591,387, filed Oct. 18, 1968 (now abandoned), which is, in turn, a continuation of my copending application Ser. No. 156,563, filed Nov. 29, 1961 (now abandoned); application Ser. No. 43,308, filed Apr. 28, 1970, (now pending) also being a division of the aforesaid application Ser. No. 709,676, filed March 1, 1968.

This invention relates to the manufacture of containers formed by winding continuous filaments under tension about a mandrel, the filament being impregnated with a bonding resin and subsequently cured, thereby forming a container shell of new and improved construction. There is accordingly provided by this invention a new and improved method and apparatus for forming the container, as well as a novel container structure.

Precision instruments and the like often require shipping containers which must withstand unusually severe and adverse stress and environmental conditions. There is accordingly a continuing demand for shipping containers constructed of such a character to require the container to be airtight, watertight, with virtually no moisture transmission through the structure, while retaining such properties after e.g., repeated drops from a 30 inch height onto a steel plate, at the container corners. Containers which meet such rigid standards are generally constructed from fiberglas reinforced plastic by a method commonly referred to as pre-formed-matched metal die process.

This process normally involves the molding of random oriented chopped fiberglas roving, bonded with a polyester resin. The physical properties of the containers formed by such techniques are such that extremely thick corners must be provided in order to meet the stringent specifications of the character described.

The technique of filament winding as a method of production of motor cases, pressure vessels, and similar hardware for the aerospace industry and other industries requiring containers meeting stringent specifications has enjoyed a rapid growth in the recent years. The strength-weight ratio is the paramount factor in production of containers produced by the filament winding technique. Furthermore, it has been found that containers produced by the filament winding techniques are less costly than containers which are molded or are produced by other methods.

Additionally, such prior art methods of forming containers present inspection and quality control problems in mass-production, which are difficult to evaluate by non-destructible testing techniques — and consequently, the containers have a highly undesirable reliability ratio.

There are a number of commercially available machines for filament winding about a mandrel for the production of containers. However, these previous filament winding machines have been applied solely to the manufacture of components that were surfaces of revolution. There have even been some attempts to produce a box-like structure by filament winding about a mandrel such as by the apparatus described in the A. Rausch U.S. Pat. No. 2,731,376. However, the commercially available apparatus for filament winding constitutes mere elaborations of conventional lathes for rotating a mandrel and shifting a roving strand with respect to a rotating mandrel. These devices are grossly inefficient and require constant manual attention in the production of containers thereon.

OBJECTS

It is accordingly an object of this invention to provide a new and improved method for forming containers, wherein a container shell is formed by winding a continuous filament under tension about a planar mandrel conforming to the desired interior dimension of the finished container. The filament is impregnated or coated with a bonding resin, the filament resin shell thence being treated as necessary to cure the bonding resin, thereby completing the structure. The mandrel is in the shape of a rectangular solid and the winding step is accomplished by relative rotation of the mandrel with respect to a filament feeding arm, there also being provided relative longitudinal movement so that the mandrel is continuously wrapped from one end thereof to the other. The impregnation or coating of the filament by the bonding resin may take place before or after the winding step.

Another object of this invention is to provide a new and improved apparatus for carrying out the winding step of the above-described method of forming containers, means being provided to wrap the opposed planar surfaces of the mandrel by a feeding arm. In this regard, driving means are provided for rotating and reciprocating the feeding arm, together with means for supporting the mandrel and changing the position thereof with respect to the apparatus. To this end, there is provided a stationary frame which carries a vertically movable and rotatable filament feeding arm axially offset from the axis of rotation so as to effectively traverse and wind a mandrel mounted therebelow. The mandrel is supported on a mandrel table, a vertically movable stabilizing plate, and horizontally movable opposed clamping members. Briefly, these members are constructed and arranged to be operated by fluid pressure means such as hydraulic cylinders, the mandrel supporting members being constructed and arranged to provide a rotation of the mandrel for the sequential winding steps.

It is another salient object of the present invention to provide a new and improved apparatus of the type stated in which the opposed planar surfaces of a mandrel are wrapped by a feeding arm. In this embodiment of the apparatus, the mandrel is supported on a mandrel table and is engageable by a vertically movable stabilizing plate. The mandrel table is shiftable through a 90° arc and is cooperative with a second mandrel table which is shiftable to a vertical position when the first table is disposed in a horizontal position. Accordingly, each of these mandrel tables optionally serves as stabilizing plates and mandrel tables. Furthermore, the members are constructed and arranged to be operated by fluid pressure means.

These and numerous further objects, advantages, and novel features of the present invention will become apparent in the specification and claims taken in connection with the ac-companying drawings.

FIG. 2 is a top plan view of the filament winding apparatus of FIG. 1;

FIG. 3 is a fragmentary vertical sectional view taken along line 3—3 of FIG. 2;

Figure 1:
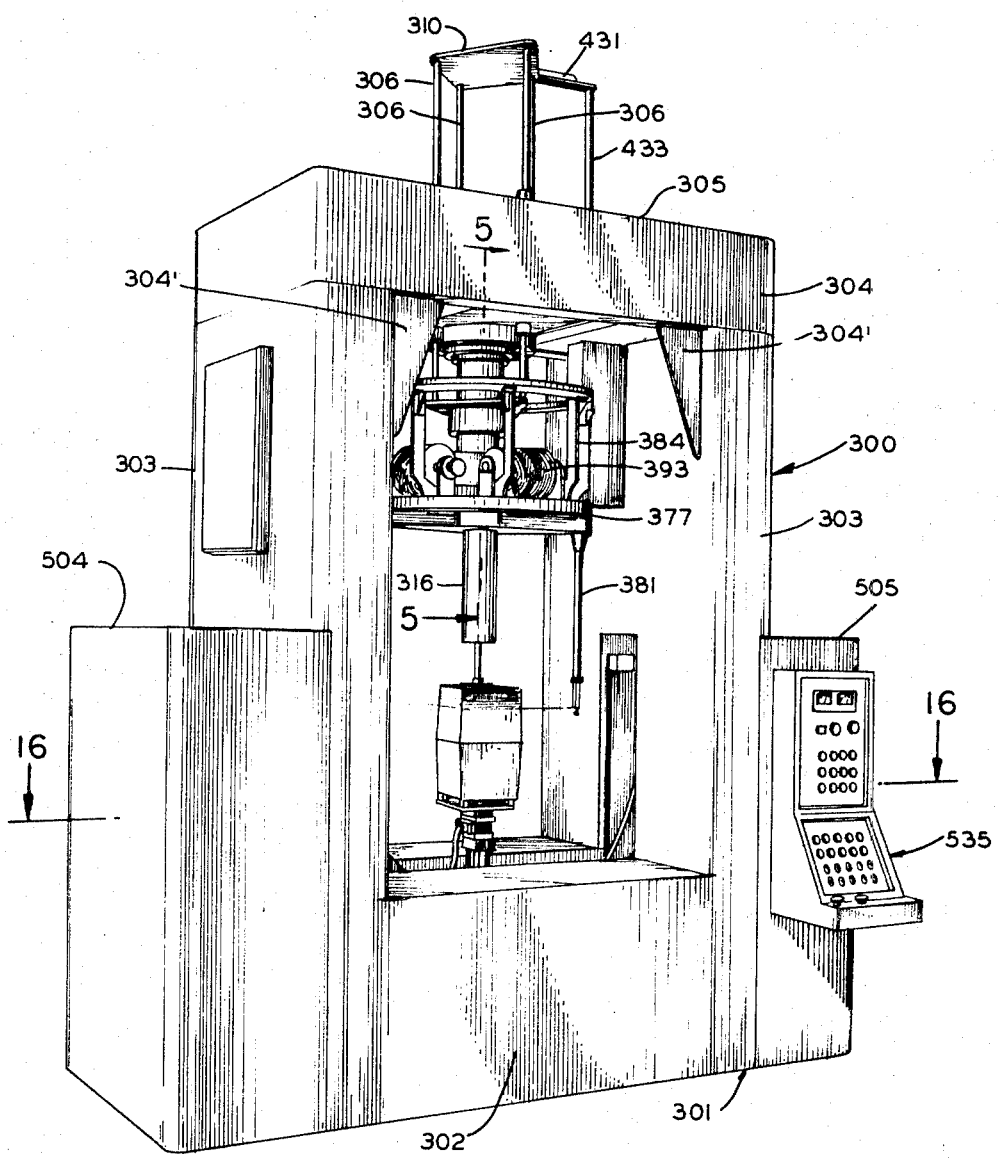
FIG. 1 is a perspective view of a filament winding apparatus constructed in accordance with and embodying the present invention.
Figure 5:
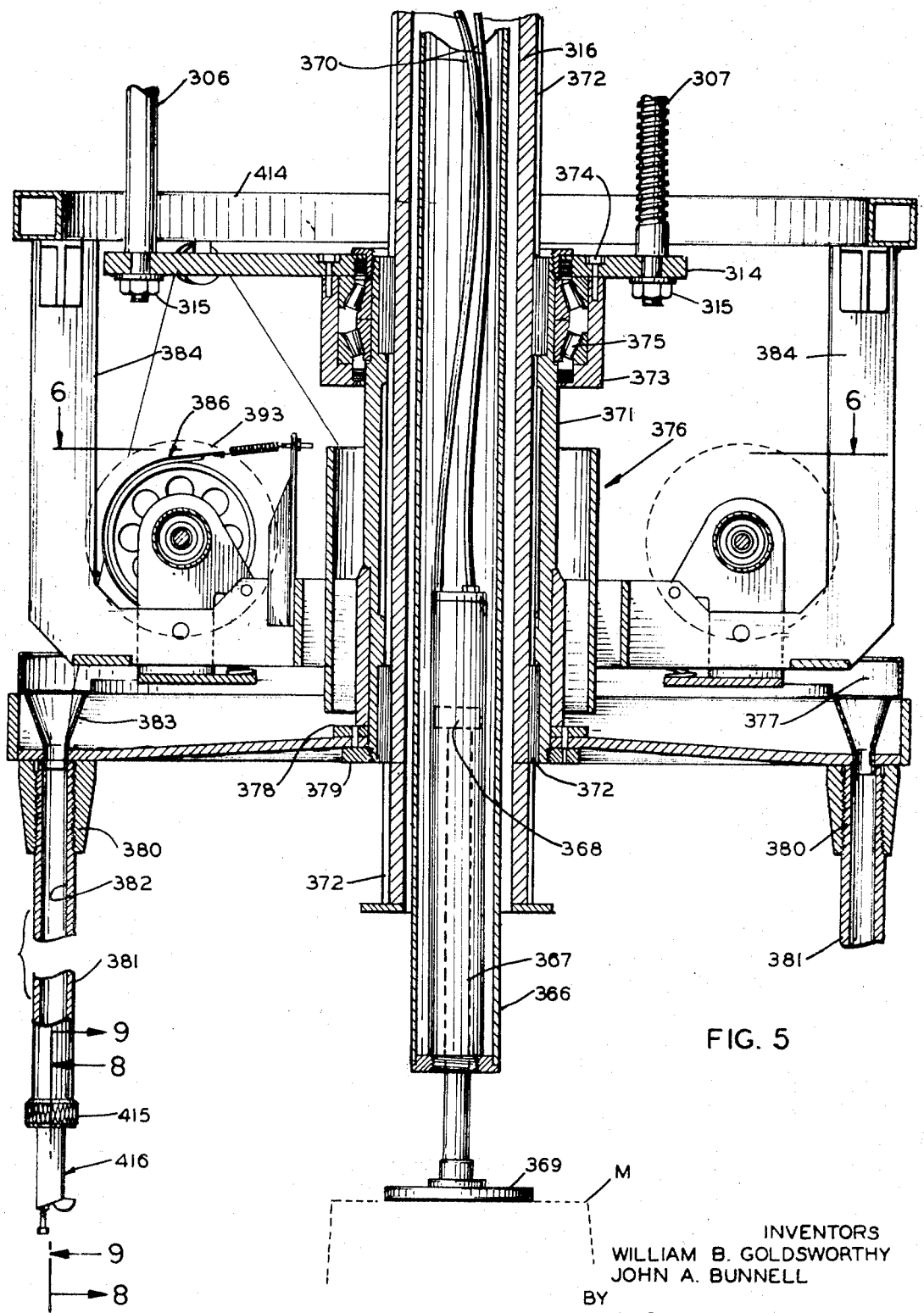
FIG. 5 is a vertical fragmentary sectional view taken along line 5—5 of FIG. 1.
Figure 22:
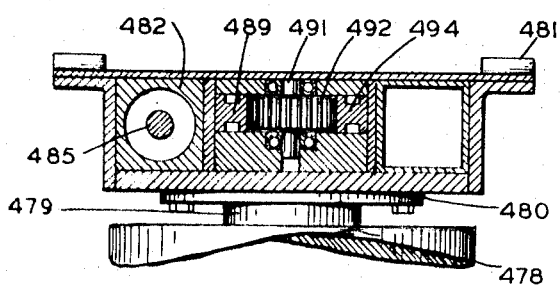
Figure 16:
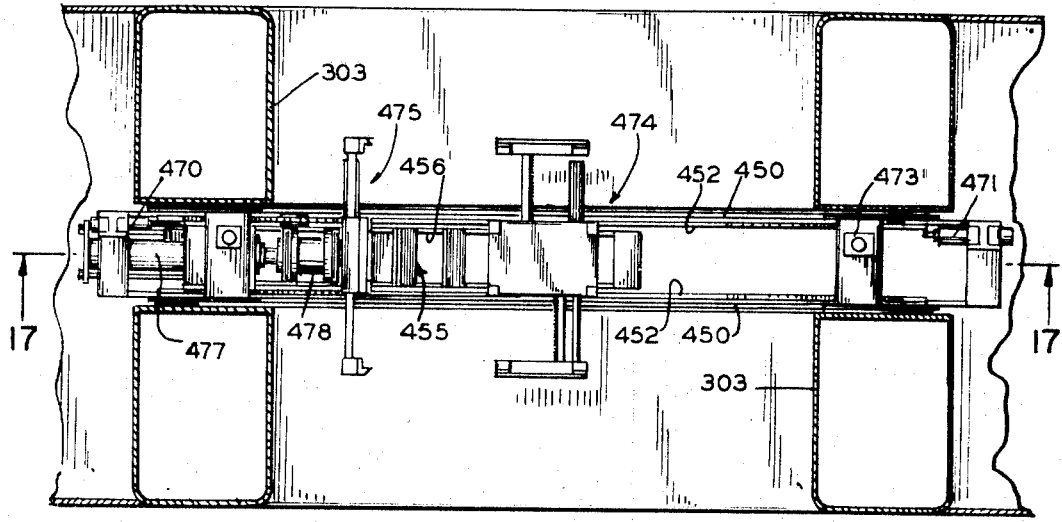
Figure 17:
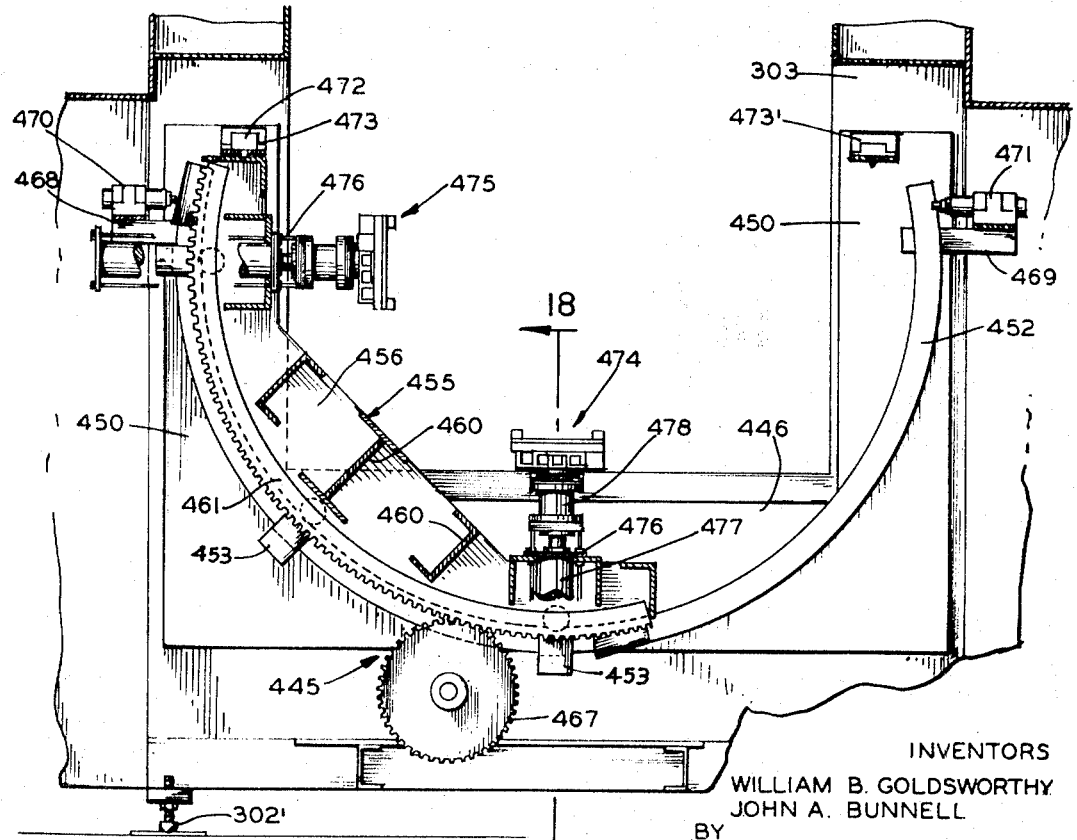
Figure 18:
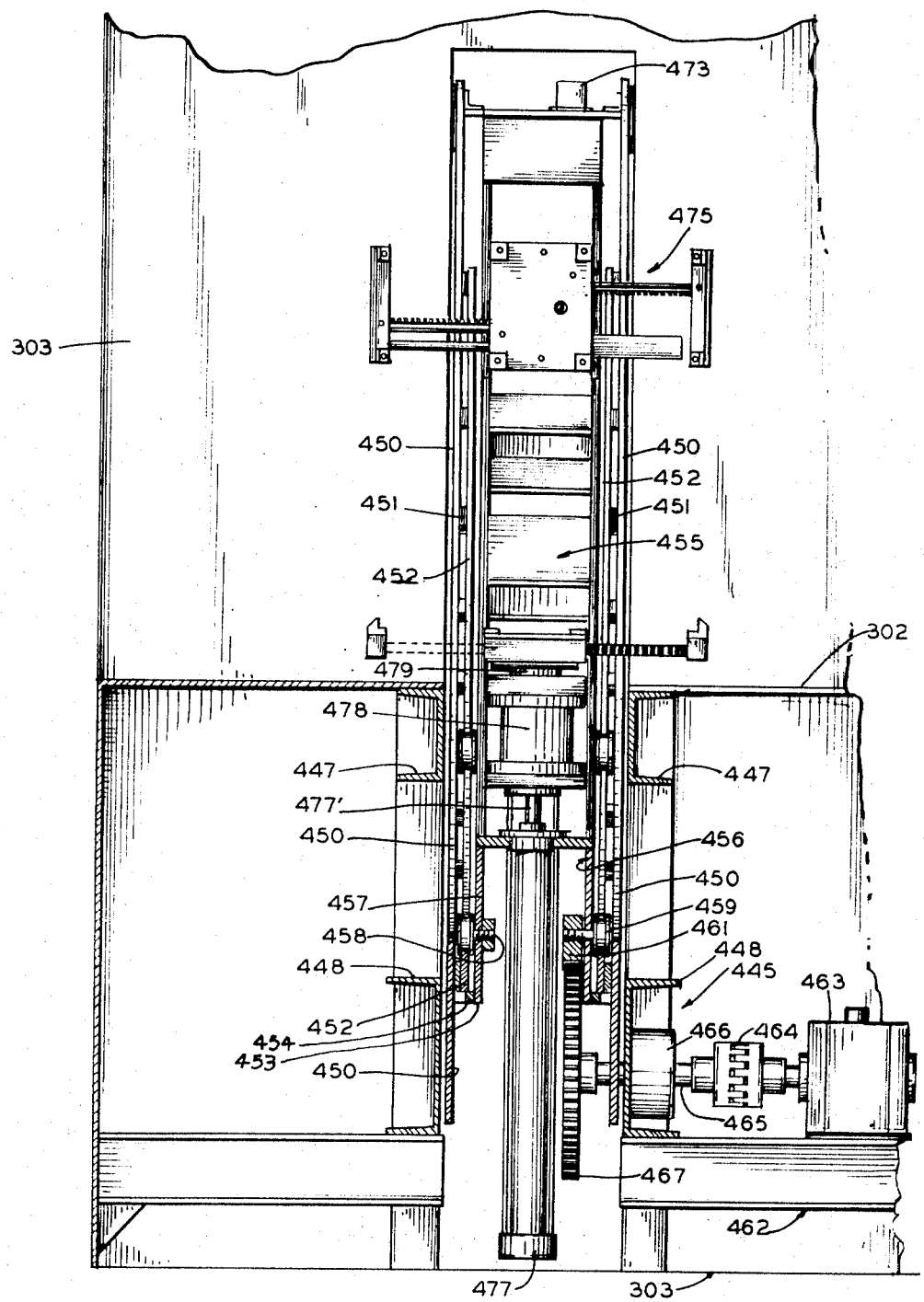
Figure 19:
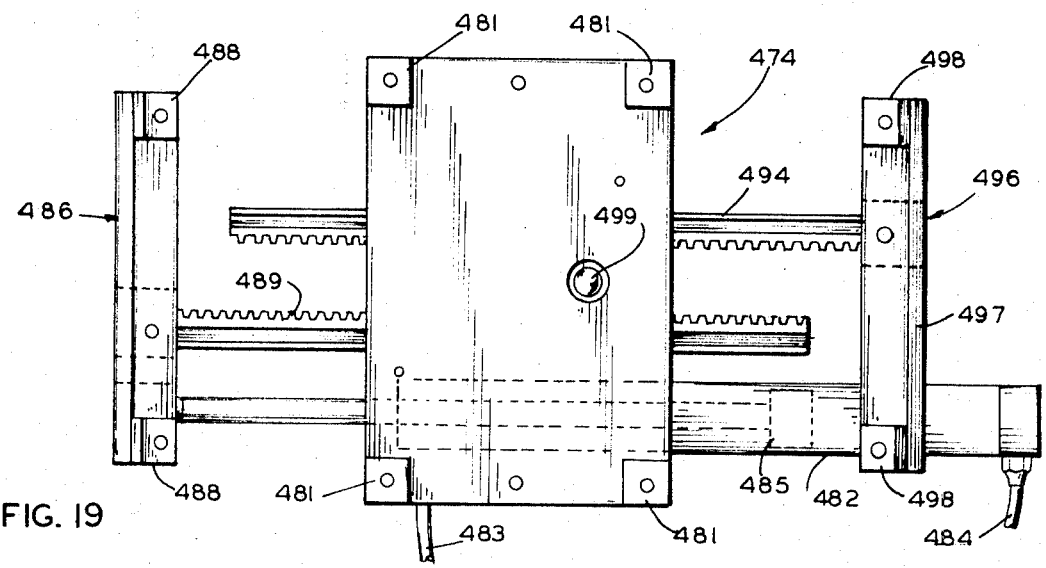
Figure 20:
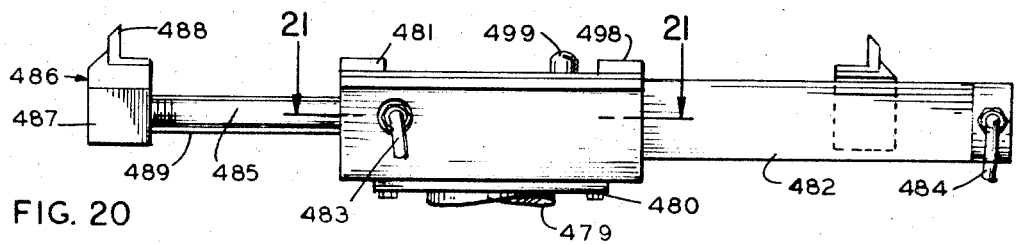
Figure 21:
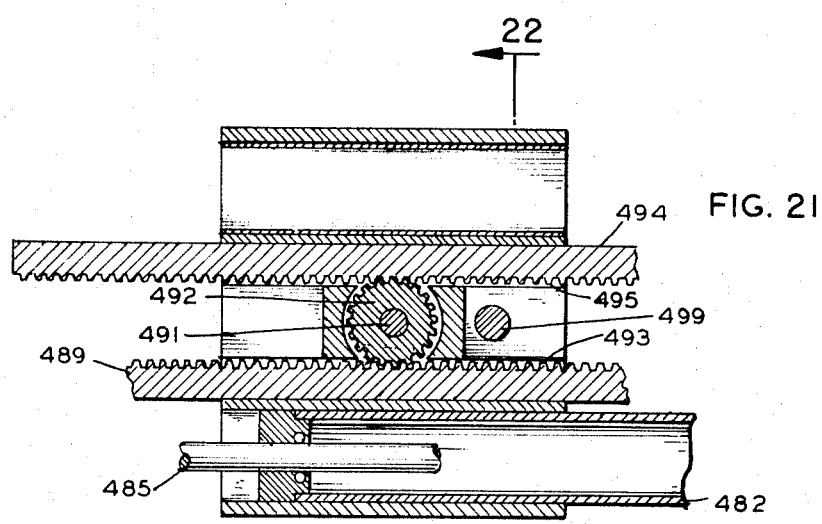

FIGS. 8 and 9 are fragmentary vertical sectional views taken along lines 8—8 and 9—9 respectively of FIG. 5 and showing a portion of the feeding head forming part of the present invention;

FIG. 10 is a fragmentary sectional view taken along line 10—10 of FIG. 9;

FIGS. 11 and 12 are fragmentary sectional views taken along lines 11—11 and 12—12, respectively of FIG. 10;

FIG. 13 is a side elevational view of the photodiode control system forming part of the apparatus of FIG. 1;

FIGS. 14 and 15 are vertical fragmentary sectional views taken along lines 14—14 and 15—15 respectively of FIG. 13;

FIG. 16 is a horizontal sectional view taken along line 16—16 of FIG. 1;

FIG. 17 is a vertical fragmentary sectional view taken along line 17—17 of FIG. 16;

FIG. 18 is a vertical fragmentary sectional view taken along line 18—18 of FIG. 17;

FIG. 19 is a top plan view of the table and clamping mechanism forming part of the apparatus of FIG. 1;

FIG. 20 is a side elevational view partially broken away and in section of the table and clamping mechanism of FIG. 19;

FIG. 21 is a fragmentary sectional view taken along line 21—21 of FIG. 20;

FIG. 22 is a fragmentary sectional view taken along line 22—22 of FIG. 21;

FIGS. 23-34 relate to the method of filament winding about three axes of a mandrel employing the apparatus of FIG. 1 et seq. of which:

FIG. 23 is a schematic side elevational view showing the mandrel in the beginning of the first positioning cycle;

FIG. 24 is a schematic side elevational view showing the mandrel shifted 90°;

FIG. 25 is a schematic side elevational view showing the mandrel rotated 90° in addition to the first wrapping position;

FIG. 26 is a perspective view of the mandrel showing filament wrapped about the first axis of rotation on four planar sides;

FIG. 27 is a schematic side elevational view showing the mandrel being shifted to the second wrapping position;

FIG. 28 is a schematic side elevational view showing the mandrel shifted 90°;

FIG. 29 is a schematic side elevational view showing the mandrel then rotated 90° to the second wrapping position;

FIG. 30 is a perspective view showing the mandrel wrapped about two axes of rotation showing four planar sides having a unidirectional wrap and two planar sides having a bidirectional wrap;

FIG. 31 is a schematic side elevational view showing the mandrel being shifted to the third wrap position;

FIG. 32 is a schematic side elevational view showing the mandrel shifted 90°;

FIG. 33 is a schematic side elevational view showing the mandrel rotated 90° to the third wrapping position; and FIG. 34 is a perspective view of the mandrel showing all six surfaces having a bidirectional wrap.

The rectangularly shaped container, which is produced according to the practice of the present invention, generally includes a bidirectional wrap on each of the planar surfaces or a multiplicity thereof so that a cross section of the surface provices a pair of layers of filaments, one of which is generally perpendicular to the plane of the other. The actual number of layers of filaments depends generally on the desired container wall thickness. Numerous modifications of the winding step can be provided, such as the increased local region thickness in portions of the container. This may be accomplished by simply slowing the longitudinal speed of the arm 22 with respect to the rotary speed thereof. In a preferred form of thickness buildup, the feeding arms are reciprocated a number of times in the local region where thickness is desired.

FULLY AUTOMATIC WINDING APPARATUS

The preferred apparatus 300 for practicing the present invention is fully automated in its operation and may be programmed for the complete winding of a mandrel without constant manual attention.

The apparatus 300 generally comprises an outer frame forming housing 301, which includes a base housing 302 having four depending legs 302' secured to the bottom wall thereof. Formed with and extending upwardly from the base housing 302 are four upright stanchions 303 which are located at the corners of a rectangular plane. Furthermore, the stanchions 303 are rectangular in horizontal cross section and each of which is formed by a pair of abutting U-shaped parallel channels, which are joined along their longitudinal margins. Welded or otherwise rigidly secured to the upper ends of the stanchions 303, and carried thereby is a rectangularly shaped upper support structure 304, which is further reinforced by triangularly shaped gussets 304' secured to the stanchions 303 and to the frame structure 304, in the manner as illustrated in FIG. 1.

The upper frame structure includes a pair of longitudinally extending supports 305 and extending therebetween are a pair of longitudinally spaced, transversely extending supports 305'. Similarly extending between the supports 305' are longitudinally extending intermediate supports 305'', as illustrated in FIG. 2. Extending upwardly of the upper support structure 304 in the manner as illustrated in FIGS. 1-3 are three spaced guide rods 306. Similarly extending upwardly of the upper frame structure 304 is a jack screw or jack shaft 307. The jack screw 307 and the guide rod 306 extend through apertures formed in a support plate 308, the latter being supported in the intermediate supports 305'' and removably retained on the upper end of the upper frame structure 304 by means of eye bolts 309, in the manner as illustrated in FIGS. 2 and 3. Rigidly secured to the upper end of each of the guide rods 306 and to the jack screw 307 is a top plate 310. The guide rods 306 and the jack screw 307 are provided with an upper threaded portion 311 for the accommodation of locking nuts 312.

Figure 4:
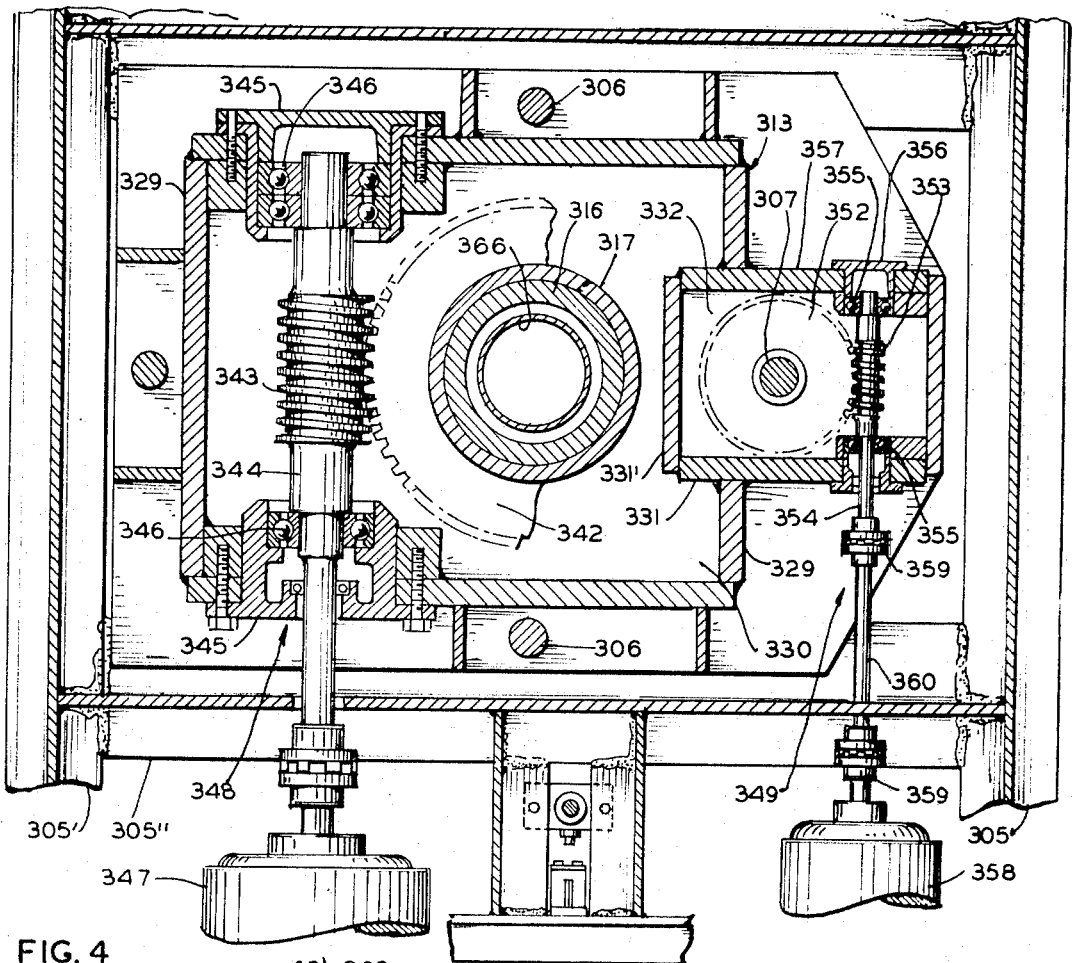
FIG. 4 is a horizontal fragmentary sectional view taken along line 4—4 of FIG. 3 and showing a portion of the drive mechanism therein.

The guide rods 306 and the jack screw 307 extend downwardly into a drive housing 313, which is more fully illustrated in FIGS. 3 and 4. At their lower ends, the guide rods 306 and the jack shaft 307 are externally threaded and support a main mounting plate 314 in the manner as illustrated in FIG. 5. The mounting plate 314 is, in turn, retained on the lower end of the guide rod 306 and the jack shaft 307 by means of locking nuts 315.

The main drive housing 313, which is more fully illustrated in FIGS. 3 and 4 is located in the upper support structure 304. The drive housing 313 includes suitable mechanism, which is designed to provide both rotating movement and vertical shifting movement. The shaft 316 is rigidly secured to an outer quill shaft 317 and rotatable therein by means of locking pins 318 so that the outer quill shaft 317 is rotatable with the main drive shaft 316 in the manner as illustrated in FIG. 3. The lower end of the quill shaft 317 is rigidly secured to a bearing housing 319, which includes tapered roller bearings 320 enabling rotatable movement of the main drive shaft 316. The upper end of the quill shaft 317 is also secured to a similar bearing housing 321 having tapered internal roller bearings 322 which also provide for the rotatable movement of the main drive shaft 316 within the outer quill shaft 317.

The main drive housing 313 includes a plurality of depending I-beams secured at their upper ends to the underside of the support plate 308 and are located in the form of a rectangular frame. A plurality of support bars 324 extend inwardly from the I-beams 323. A base plate 325 is secured to the bearing housing 319 in the manner as illustrated in FIG. 3 and is also supported by the lower ends of the I-beams 323. The support plate 308 is provided with a large central aperture 327 and removably disposed over the support plate 308 is a cover plate 328, which in turn, supports the upper bearing housing 321 in the manner as illustrated in FIG. 3. Thus, it can be seen that the cover plate 328 can be removed and will carry therewith the upper bearing housing 321.

The main drive housing 313 is also provided with four spaced end walls 329 secured to the support bars 324 and form an internal compartment 330. Furthermore, it can be seen that one of the end walls 329 is rectangularly apertured to accommodate a smaller rectangular housing 331 having side walls 331' and forming an internal compartment 332 for reasons which will presently more fully appear. Each of the guide rods 306, moreover, is reciprocatively supported in the main drive housing 313 by means of linear ball bearings 333. The guide rods 306 are reciprocatively supported in the cover plate 328 by means of similar linear bearings 334 in the manner as illustrated in FIG. 3.

Rigidly secured to the support plate 308 and extending upwardly through the cover plate 328 are a plurality of eye bolts 335, which are capable of being engaged by conventional hooks and lifting mechanism (not shown) for removing the entire main drive housing 313. The cover plate 328 is also provided with a plurality of eye bolts 335' for engagement by conventional hooks so that the plate 328 may be lifted from its closurewise position, thereby providing access to the interior of the main drive housing 313. Furthermore, the housing 313 is entirely sealed along the end walls 329 and the base plate 325 so that it is capable of accommodating a conventional lubricating fluid. The cover plate 328 is apertured for accommodating a pair of grommets 336, which are capable of removably receiving dip sticks 337, 338. By reference to FIG. 9, it can be seen that the dip stick 337 is capable of being inserted into the internal compartment 330 for determining the oil level therein, and the dip stick 338 is capable of being inserted into the compartment 332 for determining the oil level in this compartment.

Concentrically disposed about the quill shaft 317 and being rigidly secured thereto by means of locking pins 339 is a diametrically enlarged hub 340. Rigidly secured to the underside of the hub 340 by means of machine screws 341 is a sprocket 342. The sprocket 342 is disposed in meshing engagement with a worm gear 343, the latter being integrally formed with or otherwise secured to a worm shaft 344. The side walls 331 are transversely apertured for accommodating conventional ball bearing housings 345, which contain conventional ball bearings 346 for journaling the worm shaft 344 therein. The worm shaft 344 is, in turn, connected to a conventional D.C. electric motor 347 for actuation of the worm gear 343. Thus, it can be seen that as the motor 347 is energized, it will rotate the worm shaft 344 and the worm gear 343, which will in turn rotate the sprocket 342. Since the sprocket 342 is rigidly secured to the main drive shaft 316, by means of the pins 318, the drive shaft 316 will also rotate therewith.

It can be seen that the electric motor 347 is rigidly mounted within the upper frame structure 304 in the manner as illustrated in FIG. 2. In essence, therefore, it can be seen that the combination of the electric motor 347, the worm gear 343 and the sprocket 342 and all of the intermediate components associated therewith, as previously described, form a rotating drive mechanism 348. Moreover, it can be seen that this rotating drive mechanism 348 is located in the compartment 332 of the main drive housing 313.

The main drive housing 313 is also provided with a reciprocating drive mechanism 349, which is located in the compartment 330 and is also more fully illustrated in FIGS. 3 and 4. The jack shaft 307 is concentrically disposed within a gear tube 350 serving as a drive tube and which is provided with threads 351 on its interior surface for meshing engagement with the exterior threads of the jack shaft 307. Concentrically disposed about and being rigidly secured to the gear tube 350 is a worm gear 352. The worm gear 352 is disposed in meshing engagement with a worm gear 353, the latter being mounted on a worm shaft 354, which is, in turn, journaled in ball bearings 355. The ball bearings 355 are retained within bearing housings 356, the latter being inserted in apertures formed in end walls 357, which are, in turn, secured to the side walls 329. The worm shaft 354 is, in turn, connected to a conventional D.C. electric motor 358 by means of couplings 359 and an intermediate drive shaft 360.

By further reference to FIG. 3, it can be seen that the gear tube 350 is supported by the upper tapered roller bearings 361, which are secured to a bearing support bracket 362, the latter being in turn mounted in the wall 329 of the housing 319. The lower end of the gear tube 350 is similarly supported in tapered roller bearings 363, which are, in turn, mounted in a bearing housing 364, the latter being secured to the base plate 325 of the main drive housing 313. Thus by means of the aboveoutlined construction, it can be seen that as the electric motor 358 is energized, it will rotate the intermediate drive shaft 360, the worm shaft 354 and the worm gear 353. This will, in turn, cause rotation of the worm gear 352. Since the jack shaft 307 is disposed in meshing engagement with the worm tube 350, the jack shaft will reciprocate in a vertical direction. The upward and downward movement of course, depends upon the direction of rotation of the worm gear 353 and the worm gear 352. However as the jack shaft 307 is raised, it will carry therewith the plate 310 and the guide rods 306.

Secured to the upper end of the bearing housing 321 by means of bolts 365 and extending concentrically within the main shaft 316 is a cylinder supporting sleeve 366. The main support shaft 316 is open at its lower end and the cylinder support sleeve 366 extends downwardly therefrom in the manner as illustrated in FIG. 5. Rigidly secured to and disposed concentrically within the cylinder support sleeve 366 in a conventional hydraulic cylinder 367 having a movable piston 368. Secured to the lower end of the piston 368 and being rotatable with respect thereto is a stabilizing or so-called "clamping" plate 369. The cylinder 367 is actuated by hydraulic fluid lines 369' which are connected to a fluid control circuit to be hereinafter described in more detail.

Referring now to FIG. 5, it can be seen that a roving feed assembly 370 is operatively secured to and operable by the main shaft 316. An outer vertically shiftable sleeve 371 forming part of the roving feed assembly 370 is concentrically disposed about the main shaft 316. The vertically shiftable sleeve 371 is provided with a series of internally extending keys 372 which extend into mating keyways formed in the annular surface of the shaft 316 permitting vertically shiftable movement of the sleeve 371. The sleeve is secured to a bearing housing 373 at its upper end which is, in turn, secured to the mounting plate 314 by means of screws 374. The bearing housing 373 is provided with a series of tapered roller bearings 375 for permitting vertically shiftable movement of the sleeve 371 with respect to the main shaft 316. Furthermore, the sleeve 371 is keyed to the shaft 316 as indicated above and is rotatable therewith. Furthermore, it can be seen that as the mounting plate 314 is shiftable through the action of the jack screw 307 that the vertically shiftable sleeve 371 is also shiftable therewith.

Similarly secured to the shiftable sleeve 371 and being carried therewith is a spool support frame 376 which is provided with a resin housing 377 in the manner as illustrated in FIG. 5. It can be seen that the resin housing 377 is retained by means of an annular ring 378 and a locking nut 379. Depending from the upper end of the resin housing are a pair of internally threaded sleeves 380 for holding filament feeding arms 381 or so-called "feeding tubes." Furthermore, it can be seen that the feeding arms 381 are provided with a central bore 382 for accommodating filament strands threaded therethrough. Secured to the upper ends of the feeding arms 381 are funnels 383 which extend into the liquid resin contained within the resin housing 377.

Figure 7:
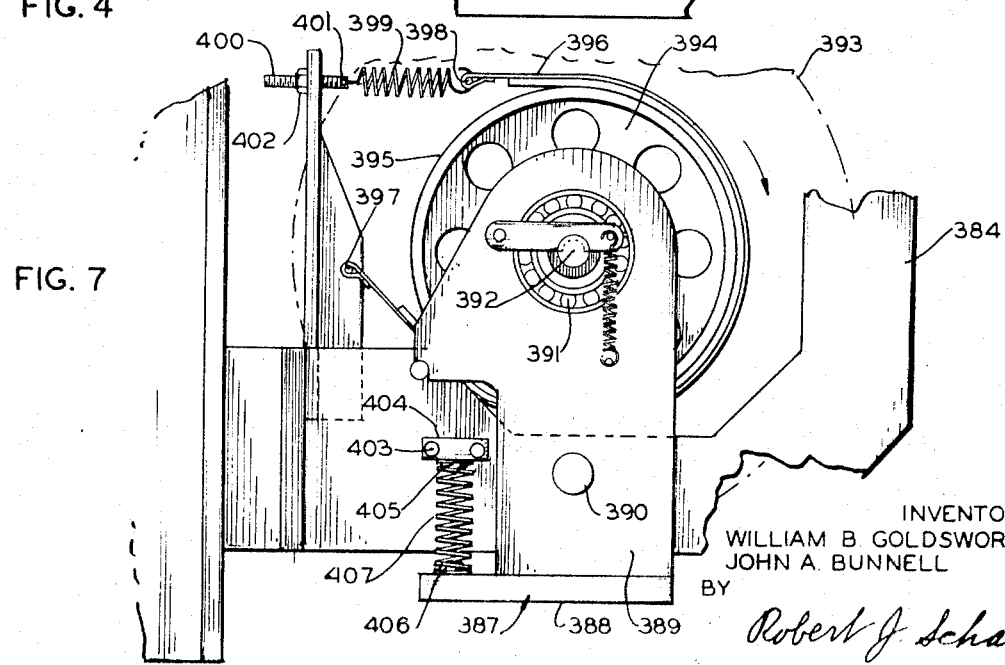
FIG. 7 is a vertical fragmentary sectional view taken along line 7—7 of FIG. 6 and showing a portion of the filament dispensing mechanism forming part of the present invention.
Figure 6:
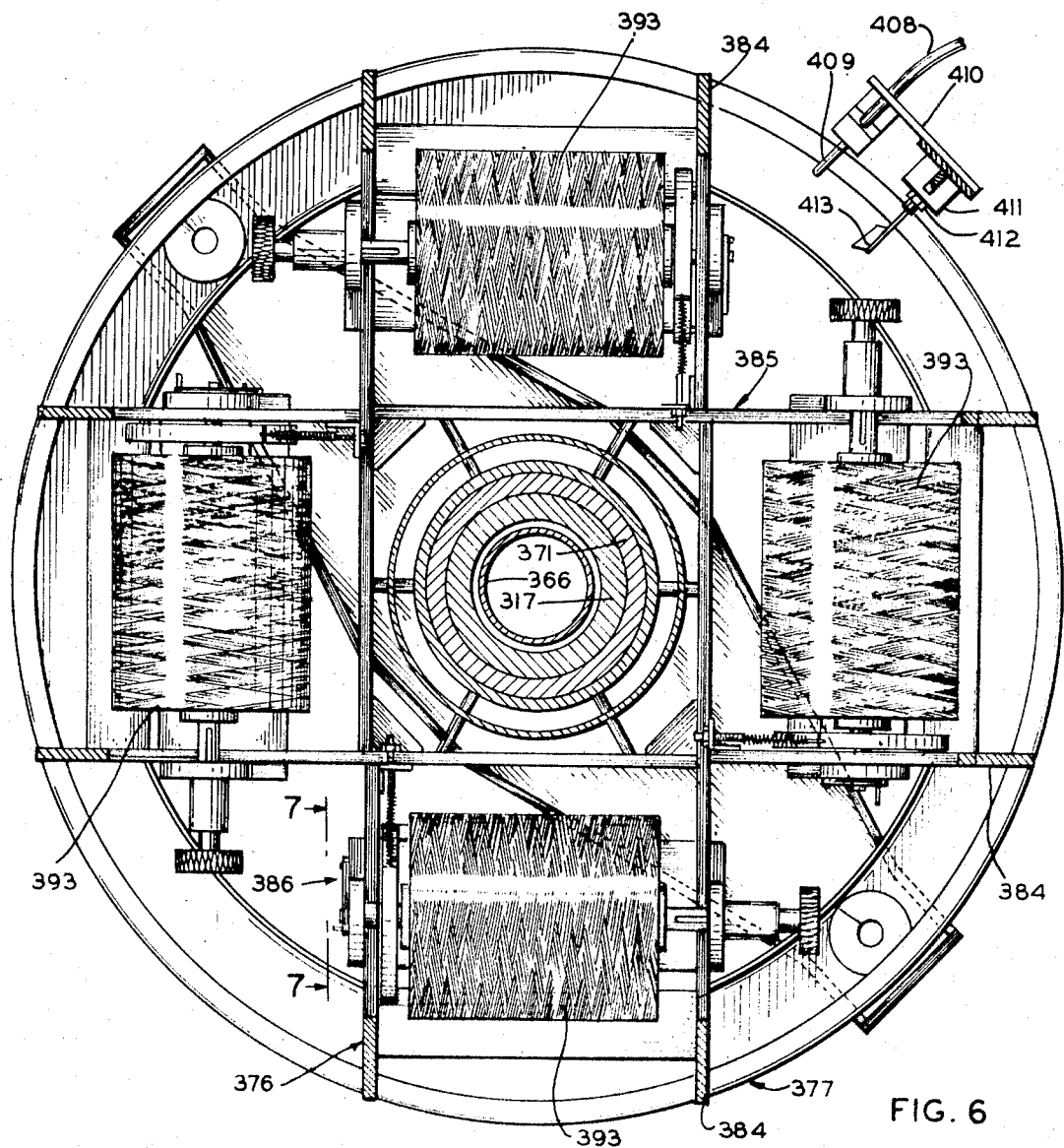
FIG. 6 is a horizontal fragmentary sectional view taken along line 6—6 of FIG. 5.

Also secured to the sleeve 371 and extending radially therefrom are pairs of circumferentially spaced outwardly extending L-shaped brackets 384. The L-shaped brackets 384 form a circular grid-frame 385 which is more fully illustrated in FIG. 6 for supporting four circumferentially spaced filament dispensing mechanism 386, the latter being more fully described in my copending application Ser. No. 690,495, filed Dec. 14, 1967, now U.S. Pat. No. 3,540,675, dated Nov. 17, 1970. One of the filament dispensing mechanisms 386, however, is also illustrated in FIG. 7 and includes a pivotal cradle 387. The cradle 387 includes a base plate 388 having a pair of upstanding end walls 389. Furthermore, it can be seen that the end walls 389 are pivotally mounted on the grid-frame 385 by means of shoulder bolts 390. The shoulder bolts are conventionally provided with annular shoulders (not shown) which bear against the exterior surface of the upstanding brackets 384 and thereby provide a tiltable movement between the upstanding brackets 384 and the cradle 387. The outer ends of the end walls 389 are apertured to accommodate conventional ball bearings 391. Journaled in the ball bearings 391 is a support shaft 392 for holding conventional spools of filament 393 in the manner as illustrated in FIG. 6 and FIG. 7.

A circular brake drum 394 is keyed or otherwise secured to the support shaft 392 and is provided with an annular braking surface 395. The braking surface 395 may be formed of stainless steel, asbestos or any material normally employed in brake drums of this type. A brake belt 396 is terminally looped at one end and is secured to a dowel 397 which is, in turn, secured to the upstanding bracket 384. The opposite end of the brake belt 296 is also terminally looped and secured to a pin 398 which forms part of a tension spring 399. The opposite end of the tension spring 399 is secured to a bolt 400 having a dowel 401 for engaging the tension spring 399 in the manner as illustrated in FIG. 7. The bolt 400 also extends through an aperture formed in the upstanding bracket 384. The bolt 400 is threaded for most of its axial length. It is, therefore, possible to adjust the tension on the brake belt 396 by merely turning a hexagonal jam nut 402 and urging a greater portion of the shank of the bolt 400 through the aperture in the bracket 384. The underside of the brake belt 396 is also provided with a suitable brake medium such as asbestos or the like and which bears against the braking surface 395.

Secured to the exterior surface of the L-shaped bracket 384 by means of bolts 403 is an outwardly extending retaining block 404 having a downwardly presented boss 405 on its underside. Similarly mounted on the base plate 388 of the cradle 387 is an aligned boss 406 and mounted upon each of the cooperating bosses 405, 406 is a compression spring 407 which biases the entire cradle 387 in a counterclockwise direction, reference being made to FIG. 28. Thus, it can be seen that the entire spool assembly and cradle 387 is pivoted in such a direction so as to release the brake belt 396 from engagement with the brake drum 394 by reducing tension on the brake belt 396. In essence, the spring 407 balances the weight of the filament spool and any forces imposed thereupon about the axis of pivotal movement of the cradle 387 which extends through the axial centerline of the bolt 390.

The remainder of the structure of the filament dispensing mechanism is more fully illustrated and described in the aforementioned copending application Ser. No. 690,495, filed Dec. 14, 1967. Furthermore, this type of system is specifically designed for applications of this type so that uniform tension on the device throughout the payout life of the spool is maintained.

Resin is supplied to the resin housing 377 by means of a resin supply line 408, which is in turn connected to a suitable source of liquid resin (not shown). The resin line 408 terminates in a feeding tube 409, which is stationary with respect to and is designed to admit liquid resin into the open upper end of the housing 377 in the manner as illustrated in FIG. 6. The feeding tube 409 is conventionally mounted on a support plate 410, which is in turn, secured to one of the stanchions 303. Also secured to the support plate 410 is a liquid level switch 411, which is electrically connected to and controls the input of fluid to the resin housing 377 by means of a pilot operated switch 412. The liquid level switch 411 is a conventional device and is, therefore, neither illustrated nor described in further detail herein. However, this device is generally a flag-operated device which includes a depending flag 413 disposed within the trough of the housing 377. The amount of biased movement of the flag 413 generates a control signal which is in turn transmitted to the pilot operated switch 412 for actuating the same.

Secured to the upper end of each of the L-shaped brackets in the manner as illustrated in FIG. 5 is a circular support ring 414, for supporting conventional take-off rollers (not shown). Generally, the filament strands from each of the four spools are trained over the rollers and threaded through the bore 382 of the feeding tubes 381. In essence, a pair of strands are passed through each of the feeding tubes 381 so that a total of four individual strands may be wound on a mandrel M at any time.

Secured to the lower ends of each of the filament feeding tubes 381 by means of knurled nuts 415 are filament feedingheads 416 which are more fully illustrated in FIGS. 8–12. The feeding head 416 generally comprises a rectangularly shaped tube 417 which is secured to a circular top plate 418, the latter in turn being retained by a flange on the knurled nut 415 in the manner as illustrated in FIG. 10. Disposed within the tube 417 is a relatively hard steel section 419 and a polyethylene foam section 420 which abut against each other. In essence, the two sections are separated by a thin filament passageway 421. The filament strands from the spools 393 are passed through an aperture 422 formed in the top plate 418 and a tapered recess 423 formed in a neoprene rubber section 424. By reference to FIG. 10, it can be seen that the neoprene rubber section 424 is disposed upon the upper surface of the foam 420 and the steel sections 419.

The bore 382 of the filament feeding tube 381 is connected to the resin housing 377 so that resin passes through the aperture 422 and into the foam section 420. The amount of resin that can be held by the foam section 420 is regulated by an adjustable bolt 425 which is secured to the underside of the tube 417 by means of a sleeve 426 and locking nut 427. By adjusting the bolt 425 so that it extends upwardly within the tube 417, it is possible to compress the foam section 420 and thereby diminish the amount of liquid resin that the section 420 can hold. Conversely, by releasing the bolt 425, it is possible to reduce the compression of the foam section 420 thereby enabling the latter to hold more of the liquid resin. The steel section 419 which bears against the surface of the foam section 420 is retained by a plurality of bolts 428.

Also secured to the lower end of the tube 417 are a pair of spaced guides 429 having guide surfaces 430 for accomodating each of the filament strands which pass therethrough. As indicated previously, filament strands from two of the spools 393 are passed through each of the filament feeding tubes 381. Furthermore, by reference to FIG. 9, it can be seen that one of the guides 429 is located on a slightly higher plane than the other of the guides 429 in order to wrap the roving strands around the mandrel in adjacent abutting relationship.

Rigidly secured to the top plate 310 and extending outwardly therefrom is a light bar support bracket 431 which is provided at its upper end with suitable terminal connections 432 for electrical connection to a control circuit to be hereinafter described in more detail. Secured to the bracket 431 is a downwardly extending light bar 433 which is also concentrically movable within a cylindrical guide sleeve 434, the latter in turn being secured to the upper support structure 304 in the manner as illustrated in FIGS. 1 and 15. At its lower end, the light bar 433 is provided with a support plate 435 for retaining a pair of actuating lights 436 in the manner as illustrated in FIGS. 13 and 14. The actuating lights 436 are connected to the connectors 432 through conductors 437, which extend through a hollow portion of the bar 433.

Rigidly secured to the interior surface of one of the stanchions 303 are a pair of brackets 439 which in turn support a connector block 440. The connector block 440 is provided with a series of vertically aligned receptacles 441 for accommodating suitable photocells 442. Furthermore, the block is internally bored and provided with an aperture 443 for accepting lead lines 444 from each of the receptacles 441. By means of this construction, it is possible to program the vertical shifting movement of the feeding arms 381. Furthermore, by reference to FIG. 15, it can be seen that the two rows of receptacles 441 are slightly offset with respect to each other at the same distance that the two actuating lights 436 are offset with respect to each other. Accordingly, when one light 436 is in line with a receptacle in one vertical column, the other actuating light 436 will be disposed between two receptacles 441 of the opposite vertical column.

Operatively mounted in the base housing 302 is a mandrel support and shift device 445 which is more fully iillustrated in FIGS. 16–22. The mandrel shift and support device 445 is generally mounted in an elongated slot 446 formed in the base housing 302 and in the stanchions 303, in the manner as illustrated in FIGS. 1, 16 and 17. Extending longitudinally between the stanchions 303 and being welded or otherwise rigidly secured thereto are pairs of transversely spaced upper and lower U-shaped support channels 447 and 448. Similarly welded or otherwise rigidly secured to the support channels 447, 448 and the stanchions 303 are semicircular rail supporting plates 450 and secured to the rail support plates 450 by means of spacing plates 451 are semicircular trackways 452. By reference to FIGS. 16 and 18, it can be seen that these semicircular trackways 452 are mounted upon opposite sides of the longitudinally extending slot 446.

A mandrel support carriage 455 is shiftable along the semicircular trackways 452 and generally comprises a U-shaped frame 456 including a pair of downwardly extending transversely spaced roller support plates 457. Integrally formed with the support plates 457 are three arcuately spaced pairs of radially extending ears 453 which are formed with laterally struck retaining blocks 454. The blocks 454 are capable of engaging the underside of the guide rail 452 to prevent any upward jarring of the carriage 455. Secured to the plates 457 by means of pins 458 are flanged rollers 459 which are movable along the trackways 452 in the manner as illustrated in FIGS. 17 and 18. By additional reference to FIGS. 17 and 18, it can be seen that the frame 456 is reinforced by transversely extending support members 460. Secured to one of the plates 457 on the interior surface thereof, is a semicircular rack 461, which extends for the entire length of the carriage 455.

Rigidly mounted upon a motor support frame 462, which is in turn secured to a base housing 302, is a conventional hydraulic motor 463 or so-called "rotac." The rotac 463 is provided with a drive shaft connected to a conventional universal joint 464. A drive shaft 465 is journaled in a conventional bearing housing 466 and provided on its terminal end with a large pinion gear or so-called "drive gear" 467. By reference to FIG. 18, it can be seen that the gear 467 meshes with the rack 461 and by means of this structure drives the carriage 455. It can also be seen that by reversing the operation of the rotac 463, it is possible to drive the carriage 455 along the semicircular trackways 452 in either a clockwise direction or a counterclockwise direction, reference being made to FIG. 17. Rigidly mounted on the opposed stanchions 303 and extending into the semicircular slot 446 are a pair of support plates 468,469 for retaining hydraulic deceleration valves 470,471 respectively. The valves 470,471 are designed to slow down the movement of the carriage 455 as it shifts between its end positions in a manner to be more fully described in detail hereinafter. Similarly mounted on the stanchions 303 and being disposed in the semicircular slot 446 in alignment with the carriage 455 are U-shaped retaining brackets 472 for holding limit switches 473. The limit switches 473 are designed to stop the movement of the carriage 455 as it swings between its two end positions.

Rigidly mounted on the carriage 455 in the manner as illustrated in FIGS. 17 and 18 are a pair of mandrel support mechanisms 474 and 475 which are located at right angles with respect to each other. Each of the mandrel support frames is substantially identical in construction and, therefore, only one of the mechanisms 474 will be described in detail hereinafter. The mandrel support mechanism 474 is rigidly mounted on the frame 456 and comprises a circular bracket 476, which is mounted on the top plate of the frame 456. Mounted on the underside of the top plate of the frame 456 is a hydraulic cylinder 477 having a movable piston rod 477' which extends upwardly from the top plate of the frame 456. Rigidly mounted on the circular bracket 476 is a hydraulic motor 478 or so-called "rotac," which is conventional in its construction and is designed to create actuation through 90° movements. The motor 478 is, in turn, provided with a drive shaft 479 to which is secured a mandrel support plate 480. Thus, by actuation of the motor 478, it is possible to rotate the mandrel support plate 480 through a 90° clockwise rotation, and a 90° counterclockwise rotation. Furthermore, by actuation of the hydraulic cylinder 477, in a manner to be hereinafter described in detail, it is possible to raise or lower the mandrel support plate 480.

The mandrel support plate 480 is rectangular in horizontal cross section and is provided with four upstanding teflon support blocks 481, located at each of the corners of the support plate 480. The mandrel support plate 480 is more fully illustrated in FIGS. 19–22 and is actually in the form of a rectangular container having a hollow interior. Rigidly secured to and extending outwardly from one end of the mandrel support plate 480 is a conventional hydraulic cylinder 482 having a hydraulic inlet line 483 and a hydraulic outlet line 484. Furthermore, the hydraulic cylinder 482 is provided with a movable piston rod 485. The hydraulic cylinder 482 is double acting, and is, therefore, capable of driving the piston 485 in either direction.

Rigidly secured to the outer end of the piston 485 is a clamping frame 486 which comprises a rectangular block 487 and secured to the upper end of the block 487 is a pair of L-shaped retaining brackets 488. Also secured to the block 487 is a rack bar 489 which is shiftable therewith and contains a line of rack teeth 490. Mounted on the interior of the support plate 480 is a pivotal shaft 491 which retains a rotatable pinion gear 492, the latter being in meshing engagement with the rack teeth of the rack bar 489. By further reference to FIG. 21, it can be seen that the rack bar 489, which is movable with the clamping frame 486 is shiftable in an elongated slot 493, the latter being formed within the support plate 480. In like manner, a second rack bar 494, which is movable in an elongated slot 495 formed in the support plate 480 is secured to a second clamping frame 496.

By reference to FIGS. 19 and 20, it can be seen that the clamping frame 496 is located on opposite sides of the support plate 480 with respect to the clamping frame 486. In like manner, the clamping frame 496 includes a rectangular block 497 and, in turn, retains a pair of upstanding L-shaped retaining brackets 498. Thus, it can be seen that as the hydraulic cylinder 482 is actuated, it will shift the clamping frame 486 outwardly and will also shift the clamping frame 496 through the action of the rack bars 489 and 494. Accordingly, each of the clamping frames will move inwardly and outwardly in timed relationship with respect to each other through the actuation of the hydraulic cylinder 482. The mandrel support plate is provided on its upper surface with a limit switch 499 for reasons which will presently more fully appear.

The mandrel support mechanism 475 is substantially identical to the mandrel support mechanism 474 and includes a hydraulic cylinder 477a with a movable piston 477a'. Secured to the upper end of the piston rod 477a' is a 90° rotational motor or so-called "rotac" 478a'. Similarly secured to the upper end of the rotac 478a' is a mandrel support plate 480a and which is also provided with a hydraulic cylinder 482a, the latter being substantially identical to the hydraulic cylinder 482. In like manner, the mandrel support plate 482a is provided with clamping frames 486a, 496a.

By referring again to FIGS. 1–22, the basic elements of the mode of operation of the apparatus 300 can be more fully understood. By energization of the electric motor 358, the drive shaft 360 will rotate the worm gear 353 in the manner as more fully illustrated in FIGS. 3 and 4. Rotation of the worm gear 353 by meshing engagement with the spur gear 352 will rotate the gear tube 350 and thereby raise or lower the jack shaft 307. Since the jack shaft 307 is operatively secured to the guide rods 306 through the top plate 310, this entire structure will shift vertically. The shifting movement of the guide rods will also raise and lower the mounting plate 314 and this will, in turn, raise or lower the filament feeding arms 381, and the entire structure which is carried by the mounting plate 314. In addition, the hydraulic cylinder 367 can be actuated to engage the mandrel M in timed relationship to the shifting movement of the mandrel support plates 480, in a manner more fully described in detail hereinafter.

Referring again to FIGS. 3 and 4, it can be seen that energization of the electric motor 347 will rotate the worm gear 343 and hence the sprocket 342. This will, in turn, rotate the main drive shaft 316, by means of the structure more fully illustrated in FIG. 3. Accordingly, it can be seen that it is possible to obtain both rotational and vertically reciprocative movement of the main drive shaft 316.

It can be seen that if a mandrel M is disposed upon one of the mandrel support plates 480, the fiberglass filament extracted from the spool 393 can be wound on the mandrel M through the feeding arm 381. As indicated previously, the filament will be dispensed from the spool 393 at a controlled rate. The filament is threaded through the bores 382 of each of the feeding arms 381 and outwardly through the feeding heads 416. Furthermore, it can be seen that liquid resin from the resin housing 377 will be also drawn through the bore 382 and into the feeding head 416. However, as indicated previously the amount of resin which is entrained in the filament strands can be controlled by adjustment of the bolts 425. The two filament strands will be carried around the guide surfaces 430 of the guides 429 and hence to the mandrel M where it is wound thereupon. It should be recognized that the feeding heads 416 also serve as resin sealing units and as a means for stripping excess resin from the filament.

Upper and lower movement of the feeding arms 381 is controlled by the photocell and actuating light combinations more fully illustrated in FIGS. 13–15. This structure, however, is defined in more detail hereinafter. While this type of structure controls a vertical shifting movement, it can be seen that the feeding arms 381 could not be located in the same vertical plane as the two mandrel support plates 480 during resting movement thereof, inasmuch as the feeding arms 381 would interfere with shiftable movement of the mandrel support plates. Accordingly, a second actuator light 500 is mounted on one of the upstanding brackets 384. This light 500 will prevent resting movement of the feeding arms 381 in various selected positions when it is coincident with permanently mounted photocells 501 on the stancions 303.

The two mandrel support mechanisms 474,475 are also capable of shifting through 90° arcs and furthermore are movable with each other on the carriage 455. Hence, it can be seen by reference to FIG. 17 that the mandrel support mechanism 474 can be shifted to a horizontal position, that is 90° to the right and the mandrel support mechanism 475 can be shifted to a substantially vertical position, which is also 90° to the right. It can also be seen that the mandrel support plates 480 can be both rotated through 90° movements and can be raised and lowered.

In addition to the shiftable movement and the rotatable movement of the mandrel support plates 480, it can be seen that the clamping frames 486,496 will also move in timed relationship to the rotation or shifting movement of the mandrel support plates 480. These clamping frames 486,496 will move so as to engage the mandrel M disposed upon the plate 480 during shifting movement of the plate 480 and during the winding operations.

The aforementioned mechanical components forming part of the apparatus 300 of the present invention are operated by a fluid control circuit and an electrical control circuit more fully illustrated and described in the aforesaid copending application Ser. No. 709,676, filed March 1, 1968.

The operation of many of the mechanical components forming part of the fully automated winding apparatus 300 has been heretofore described. However, the overall operation of the apparatus 300 can be more fully recognized by referring to FIGS. 23–34 showing the orientation of the mandrel M during the various sequences in the winding operation.

The mandrel is placed on one of its transverse end walls in the manner as illustrated in FIG. 23. It is supported on the mandrel support plate 480 as indicated. Thereafter, the support plate 480 of the mandrel support mechanism 474 is extended to engage one of the longitudinal faces of the mandrel M, in the manner as illustrated in FIG. 23. Thereafter, the carriage 455 is rotated 90° to the position as illustrated in FIG. 24, so that the mandrel is located with its longitudinal axis in a horizontal plane. The mandrel support mechanism 475, which is now horizontally disposed, is actuated so that the support plate 480 is retracted. The stabilizing plate 369 is lowered by actuation of the hydraulic cylinder 367 so that it engages the upper planar surface of the mandrel M. In addition, the rotac forming part of the mandrel support mechanism 474 is actuated to rotate the mandrel M through a 90° turn in the manner as illustrated in FIG. 25. In this latter position, the mandrel is in the first winding position.

After the mandrel M has been located in the first winding position, the roving feed assembly is lowered and also rotated so that filament is wrapped around four planar sides of the mandrel to achieve a unidirectional wrap on four planar sides in the manner as illustrated in FIG. 26. After the entire four planar surfaces of the mandrel have been wrapped, it can be shifted to a second winding position in a manner hereinafter described in more detail. However, it should be noted that while in the first winding position, the mandrel can be wrapped with a build-up of filament in selected areas.

In order to shift the mandrel to the second winding position, the stabilizing plate 369 is raised, and the mandrel support mechanism 475 is actuated so that the mandrel support plate 480 engages the side wall of the mandrel M in the manner as illustrated in FIG. 27. After the mandrel M has been stabilized in the position as shown in FIG. 27, the carriage 455 is shifted to the left through a 90° arc so that the mandrel is located in the position as illustrated in FIG. 28. Thereafter, the mandrel support mechanism 474 is actuated so that the mandrel support plate 480a is retracted. At this point, the mandrel M can be rotated 90° in order to achieve the second wrapping position as illustrated in FIG. 29. The stabilizing plate 369 is then lowered to engage the upper planar surface of the mandrel M as illustrated in FIG. 29.

After the mandrel M has been located in the second wrapping position, for wrapping around the second axis of the mandrel, the filament feeding arms 381 are both reciprocatively lowered and raised and rotated about the mandrel M, in the manner as previously described, to provide a wrap about four additional planar surfaces. By reference to FIG. 30, it can be seen that a unidirectional wrap is created on two surfaces which previously remained unwrapped and on two surfaces which had a unidirectional wrap. Consequently, on these latter two surfaces a bidirectional wrap has been achieved. Therefore, it can be seen that after the second winding position the mandrel M has a unidirectional wrap on four planar surfaces and a bidirectional wrap on two planar surfaces thereof. It should also be recognized that any desired type of build-up can be made in the second winding position.

After the winding has been performed on the mandrel M in the second winding position, the mandrel can be shifted to the third winding position by raising the stabilizing plate 369. In addition, the mandrel support mechanism 474 is actuated so that the mandrel support plate 480a engages one transverse end of the mandrel M in the manner as illustrated in FIG. 31. After the mandrel has been stabilizied in this position, the entire carriage 455 is shifted to the right, through a 90° arc so that the mandrel M is located in the position as shown in FIG. 32. Thereafter, the stabilizing plate 369 can be lowered by actuation of the hydraulic cylinder 367, and the mandrel support plate 480, which is now located in the horizontal plane, can be retracted by actuation of the mandrel support mechanism 475. In addition, the mandrel M is rotated 90° to achieve the third winding position, as illustrated in FIG. 33. In this winding position, the filament feeding arms 381 are again reciprocated and rotated about the mandrel M to achieve a bi-directional wrap on the four additional planar surfaces. Accordingly, it can be seen that the mandrel is provided with a bidirectional wrap on each of the six planar surfaces after completion of the three winding steps. It should also be recognized that any localized desired build-up or entire build-up can be performed in this third winding position.

It should be understoodthat changes and modifications could be made in the form, construction, arrangement and combination of parts presently described and pointed out in the claims without departing from the nature and principle of my invention.

Having thus described my invention, what I desire to claim and secure by Letters Patent is:

1. A mandrel supporting table for filament winding apparatus and the like, said table comprising a mandrel supporting plate having a relatively flat supporting surface for removably retaining a mandrel having at least two angularly disposed relatively flat planar walls, shaft means supporting said plate and permitting rotatable movement thereof about a vertical axis passing through said mandrel, a pair of spaced extensible elements operatively associated with said plate, actuating means operatively associated with said extensible element for causing shiftable movement of the same, fluid power means operatively associated with said actuating means causing shiftable movement of said extensible element, a clamping member operatively mounted on each said extensible element and each clamping member having a relatively flat engaging surface which engages one of the relatively flat planar walls of said mandrel, said clamping members being shiftable with said extensible elements for engaging a mandrel disposed on said table, and means operatively associated with said shaft means permitting arcuate movement of said shaft means and supporting table through a vertically located path about a vertical axis.

2. The mandrel supporting table of claim 1 further characterized in that said actuating means is a gear mechanism and said extensible elements are rack bars which mesh with said gear mechanism.

3. A work supporting table for use with apparatus performing work on a work element, said table comprising a work element supporting plate having a relatively flat supporting surface for removably retaining a work element having at least two angularly disposed relatively flat planar walls, shaft means supporting said plate and permitting rotatable movement thereof about a vertical axis passing through said work element, a pair of spaced extensible elements operatively associated with said plate, actuating means operatively associated with said extensible element for causing shiftable movement of the same, power means operatively associated with said actuating means causing shiftable movement of said extensible element, clamping member operatively mounted on each said extensible element and each clamping member having a relatively flat engaging surface which engages one of the relatively flat planar walls of said work element, said clamping members being shiftable with said extensible elements for engaging a work element disposed on said table, and means operatively associated with said shaft means permitting arcuate movement of said shaft means and supporting table through a vertically located path about a vertical axis.

4. A work supporting apparatus for filament winding systems and the like, said apparatus comprising a plurality of spaced shiftable work supporting tables angularly located so that each are alternatively in a supporting position for supporting a work element and in a remote position where they are not in engagement with said work element, supporting plate, a pair of spaced extensible and engageable elements operatively associated with each said table, actuating means operatively associated with said extensible elements for causing shiftable movement of same and to enable engagement with the work element disposed on said tables, and means for shifting said tables through a relatively vertically located arc and moving said extensible elements in timed relationship therewith so that a first of said tables can be shifted from a remote position to a supporting position and a second of said tables can be shifted from a supporting position to a remote position with a simultaneous shifting of the work element from the second of said tables to the first of said tables.

5. The work supporting elements of claim 4 further characterized in that said work supporting tables are mandrel supporting tables and said work element is a mandrel to receive filament strands.

6. The work supporting elements of claim 4 further characterized in that said work supporting tables are operatively mounted on a carriage for common and simultaneous movement through said relatively vertically located arc.

7. The work supporting elements of claim 4 further characterized in that an individual shaft means is operatively connected to each said work supporting tables, a carriage member, each said shaft means being operatively connected to said carriage member for common and simultaneous movement of said work supporting tables through said relatively vertically located arc, and means operatively associated with each said individual shaft means for rotating said work supporting tables independently of said carriage member.

8. The work supporting elements of claim 7 further characterized in that said work supporting tables are located approximately 90° apart on said carriage so that one of said work supporting tables is located in or substantially vertical position when another is in a substantially horizontal position.

* * * * *